United States Patent
Weigold

(10) Patent No.: US 8,358,793 B2
(45) Date of Patent: Jan. 22, 2013

(54) MICROPHONE WITH IRREGULAR DIAPHRAGM

(75) Inventor: Jason W. Weigold, Newburyport, MA (US)

(73) Assignee: Analog Devices, Inc., Norwood, MA (US)

( * ) Notice: Subject to any disclaimer, the term of this patent is extended or adjusted under 35 U.S.C. 154(b) by 135 days.

(21) Appl. No.: 13/047,220

(22) Filed: Mar. 14, 2011

(65) Prior Publication Data

US 2011/0165720 A1 Jul. 7, 2011

Related U.S. Application Data

(62) Division of application No. 11/476,378, filed on Jun. 28, 2006, now Pat. No. 7,961,897.

(60) Provisional application No. 60/710,517, filed on Aug. 23, 2005.

(51) Int. Cl.
H04R 25/00 (2006.01)
(52) U.S. Cl. .................. 381/175; 29/25.41; 381/174
(58) Field of Classification Search .............. 29/594, 29/25.41, 25.42; 381/113, 116, 174, 175, 381/190, 191; 438/50, 51, 53; 257/415, 257/416, 419
See application file for complete search history.

(56) References Cited

U.S. PATENT DOCUMENTS

| | | | |
|---|---|---|---|
| 4,492,825 A | 1/1985 | Brzezinski et al. | 179/111 |
| 4,524,247 A | 6/1985 | Lindenberger et al. | 179/111 |
| 4,533,795 A | 8/1985 | Baumhauer, Jr. et al. | 179/111 |
| 4,558,184 A | 12/1985 | Busch-Vishniac et al. | 179/111 |
| 4,744,863 A | 5/1988 | Guckel et al. | 156/653 |
| 4,776,019 A | 10/1988 | Miyatake | 381/174 |
| 4,825,335 A | 4/1989 | Wilner | 361/283 |
| 4,853,669 A | 8/1989 | Guckel et al. | 338/4 |
| 4,996,082 A | 2/1991 | Guckel et al. | 427/99 |
| 5,090,254 A | 2/1992 | Guckel et al. | 73/862.59 |
| 5,113,466 A | 5/1992 | Acarlar et al. | 385/88 |
| 5,146,435 A | 9/1992 | Bernstein | 367/181 |
| 5,178,015 A | 1/1993 | Loeppert et al. | 73/718 |
| 5,188,983 A | 2/1993 | Guckel et al. | 437/209 |
| 5,303,210 A | 4/1994 | Bernstein | 367/181 |
| 5,314,572 A | 5/1994 | Core et al. | 156/643 |
| 5,317,107 A | 5/1994 | Osorio | 174/52.4 |
| 5,452,268 A | 9/1995 | Bernstein | 367/181 |
| 5,490,220 A | 2/1996 | Loeppert | 381/168 |

(Continued)

FOREIGN PATENT DOCUMENTS

EP 0 969 694 A2 1/2000

(Continued)

OTHER PUBLICATIONS

Quanbo Zou et al., *Design and Fabrication of Silicon Condenser Microphone Using Corrugated Diaphragm Technique*, Journal of Microelectromechanical Systems, IEEE Service Center, vol. 5, No. 3, Sep. 1996, pp. 197-204.

(Continued)

*Primary Examiner* — Huyen D Le

(74) *Attorney, Agent, or Firm* — Sunstein Kann Murphy & Timbers LLP

(57) ABSTRACT

A microphone is formed to have a diaphragm that is configured to improve signal to noise ratio. To that end, the microphone has a backplate having a hole therethrough, and a diaphragm movably coupled with the backplate. The diaphragm has a bottom surface (facing the backplate) with a convex portion aligned with the hole in the backplate.

7 Claims, 7 Drawing Sheets

U.S. PATENT DOCUMENTS

| | | | | |
|---|---|---|---|---|
| 5,542,295 | A | 8/1996 | Howe et al. | 73/514.18 |
| 5,593,926 | A | 1/1997 | Fujihira | 437/209 |
| 5,596,222 | A | 1/1997 | Bernstein | 257/620 |
| 5,633,552 | A | 5/1997 | Lee et al. | 310/311 |
| 5,658,710 | A | 8/1997 | Neukermans | 430/320 |
| 5,684,324 | A | 11/1997 | Bernstein | 257/415 |
| 5,692,060 | A | 11/1997 | Wickstrom | 381/169 |
| 5,740,261 | A | 4/1998 | Loeppert et al. | 381/168 |
| 5,870,482 | A | 2/1999 | Loeppert et al. | 381/174 |
| 5,923,995 | A | 7/1999 | Kao et al. | 438/460 |
| 5,939,633 | A | 8/1999 | Judy | 73/514.32 |
| 5,956,292 | A | 9/1999 | Bernstein | 367/140 |
| 5,960,093 | A | 9/1999 | Miller | 381/324 |
| 6,044,160 | A | 3/2000 | Norris | 381/191 |
| 6,128,961 | A | 10/2000 | Haronian | 73/774 |
| 6,140,689 | A | 10/2000 | Scheiter et al. | 257/414 |
| 6,243,474 | B1 | 6/2001 | Tai et al. | 381/174 |
| 6,249,075 | B1 | 6/2001 | Bishop et al. | 310/338 |
| 6,487,908 | B2 | 12/2002 | Geen et al. | 73/504.12 |
| 6,505,511 | B1 | 1/2003 | Geen et al. | 73/504.12 |
| 6,522,762 | B1 | 2/2003 | Mullenborn et al. | 381/174 |
| 6,535,460 | B2 | 3/2003 | Loeppert et al. | 367/181 |
| 6,552,469 | B1 | 4/2003 | Pederson et al. | 310/309 |
| 6,667,189 | B1 | 12/2003 | Wang et al. | 438/53 |
| 6,677,176 | B2 | 1/2004 | Wong et al. | 438/50 |
| 6,704,427 | B2 | 3/2004 | Kearey | 381/355 |
| 6,732,588 | B1 | 5/2004 | Mullenborn et al. | 73/715 |
| 6,741,709 | B2 | 5/2004 | Kay et al. | 381/175 |
| 6,753,583 | B2 | 6/2004 | Stoffel et al. | 257/416 |
| 6,781,231 | B2 | 8/2004 | Minervini | 257/704 |
| 6,812,620 | B2 | 11/2004 | Scheeper et al. | 310/324 |
| 6,816,301 | B1 | 11/2004 | Schiller | 359/290 |
| 6,829,131 | B1 | 12/2004 | Loeb et al. | 361/234 |
| 6,847,090 | B2 | 1/2005 | Loeppert | 257/418 |
| 6,857,312 | B2 | 2/2005 | Choe et al. | 73/170.13 |
| 6,859,542 | B2 | 2/2005 | Johannsen et al. | 381/174 |
| 6,914,992 | B1 | 7/2005 | van Halteren et al. | 381/113 |
| 6,925,187 | B2 * | 8/2005 | Norris et al. | 381/191 |
| 2002/0102004 | A1 | 8/2002 | Minervini | 381/175 |
| 2002/0118850 | A1 | 8/2002 | Yeh et al. | 381/313 |
| 2003/0016839 | A1 | 1/2003 | Loeppert et al. | 381/174 |
| 2003/0133588 | A1 | 7/2003 | Pedersen | 381/423 |
| 2004/0179705 | A1 | 9/2004 | Wang et al. | 381/175 |
| 2004/0184632 | A1 | 9/2004 | Minervini | 381/355 |
| 2004/0184633 | A1 | 9/2004 | Kay et al. | 381/355 |
| 2005/0005421 | A1 | 1/2005 | Wang et al. | 29/594 |
| 2005/0018864 | A1 | 1/2005 | Minervini | 381/175 |
| 2005/0089188 | A1 | 4/2005 | Feng | 381/396 |
| 2006/0280319 | A1 | 12/2006 | Wang et al. | 381/172 |
| 2006/0291674 | A1 | 12/2006 | Gong et al. | 381/174 |
| 2009/0029501 | A1 * | 1/2009 | Weigold | 438/53 |

FOREIGN PATENT DOCUMENTS

| | | |
|---|---|---|
| WO | WO 83/01362 | 4/1983 |
| WO | WO 01/20948 | 3/2001 |
| WO | WO 02/45463 | 6/2002 |
| WO | WO 2005/036698 | 4/2005 |

OTHER PUBLICATIONS

Pedersen et al., *A Polymer Condenser Microphone on Silicon with On-Chip CMOS Amplifier*, Solid State Sensors and Actuators, 1997, 3 pages.

Hsieh et al., *A Micromachined Thin-film Teflon Electret Microphone*, Department of Electrical Engineering California Institute of Technology, 1997, 4 pages.

Cunningham et al., *Wide bandwidth silicon nitride membrane microphones*, SPIE vol. 3223, Sep. 1997, 9 pages.

Schafer et al., *Micromachined Condenser Microphone for Hearing Aid Use*, Solid-State Sensor and Actuator Workshop, Jun. 8-11, 1998, 4 pages.

Sheplak et al., *A Wafer-Bonded, Silicon-Nitride Membrane Microphone with Dielectrically-Isolated, Single-Crystal Silicon Piezoresistors*, Solid-State Sensor and Actuator Workshop, Jun. 8-11, 1998, 4 pages.

Zou et al., *A Novel Integrated Silicon Capacitive Microphone—Floating Electrode "Electret" Microphone (FEEM)*, Journal of Microelectromechanical Systems, vol. 7, No. 2, Jun. 1998, 11 pages.

*IBM Advances Chip Technology With Breakthrough for Making Faster, More Efficient Semiconductors*, IBM, http://www-03.ibm.com/press/us/en/pressrelease/2521.wss Aug. 3, 1998, 2 pages.

Bernstein, *MEMS Air Acoustics Research The Charles Stark Draper Laboratory*, PowerPoint Presentation, Aug. 1999, 8 pages.

Kabir et al., *High Sensitivity Acoustic Transducers with Thin P+ Membranes and Gold Back-Plate*, Sensors and Actuators, vol. 78, Issue 2-3, Dec. 17, 1999, 17 pages.

Bernstein et al., *High Sensitivity MEMS Ultrasound Arrays by Lateral Ferroelectric Polarization*, Solid-State Sensor and Actuator Workshop, Jun. 4-8, 2000, 4 pages.

Harper (Editor-in-Chief), *Electronic Packaging and Interconnection Handbook*, Third Edition, McGraw-Hill, Chapter 7, Section 7.2.3.1, 2000, 5 pages.

Kopola et al., *MEMS Sensor Packaging Using LTCC Substrate Technology*, VTT Electronics, Proceedings of SPIE vol. 4592, 2001, pp. 148-158.

Spooner, *IBM Touts Chipmaking Technology*, CNET, http://news.cnet.com/IBM-touts-chipmaking-technology/2100-1001_3-254983.html, Mar. 29, 2001, 3 pages.

Hall et al., *Self-Calibrating Micromachined Microphones with Integrated Optical Displacement Detection*, The 11th International Conference on Solid State Sensors and Actuators, Jun. 10-14, 2001, 4 pages.

Bajdechi et al. *Single-Chip Low-Voltage Analog-to-Digital Interface for Encapsulation with Electret Microphone*, The 11$^{th}$ International Conference on Solid-State Sensors and Actuators, Jun. 10-14, 2001, 4 pages.

Fuldner et al., *Silicon Microphones with Low Stress Membranes*, The 11$^{th}$ International Conference on Solid-State Sensors and Actuators, Jun. 10-14, 2001, 4 pages.

Gale et al., *MEMS Packaging*, University of Utah, Microsystems Principles, PowerPoint Presentation, Oct. 11, 2001, 8 pages.

Fan et al., *Development of Artificial Lateral-Line Flow Sensors*, Solid-State Sensor, Actuator and Microsystems Workshop, Jun. 2-6, 2002, 4 pages.

Ko et al., *Piezoelectric Membrane Acoustic Devices*, IEEE, 2002, 4 pages.

Chen et al., *Single-Chip Condenser Miniature Microphone with a High Sensitive Circular Corrugated Diaphragm*, IEEE, 2002, 4 pages.

Ma et al., *Design and Fabrication of an Integrated Programmable Floating-Gate Microphone*, IEEE, 2002, 4 pages.

Maxim Integrated Products, *Electret Condenser Microphone Cartridge Preamplifier*, Maxim Integrated Products, Jul. 2002, 9 pages.

Neumann, Jr. et al., *A Fully-Integrated CMOS-MEMS Audio Microphone*, The 12$^{th}$ International Conference on Solid State Sensors, Actuators and Microsystems, Jun. 8-12, 2003, 4 pages.

Ono et al., *Design and Experiments of Bio-mimicry Sound Source Localization Sensor with Gimbal-Supported Circular Diaphragm*, The 12$^{th}$ International Conference on Solid State Sensors, Actuators and Microsystems, Jun. 8-12, 2003, 4 pages.

Stahl, et al. *Thin Film Encapsulation of Acceleration Sensors Using Polysilicon Sacrificial Layer*, Transducers '03, The 12$^{th}$ International Conference on Solid State Sensors, Actuators and Microsystems, Jun. 8-12, 2003, 4 pages.

Mason, Jack, *Companies Compete to Be Heard on the Increasingly Noisy MEMS Phone Market*, Small Times: News about MEMS, Nanotechnology and Microsystems, Jul. 18, 2003, 4 pages.

Yovcheva et al., *Investigation on Surface Potential Decay in PP Corona Electrets*, BPU-5: Fifth General Conference of the Balkan Physical Union, Aug. 25-29, 2003, 4 pages.

*Microphone industry to expand MEMS-based offerings*, The Information Network, online <www.theinformationnet.com>, printed Feb. 1, 2005, Nov. 14, 2003, 2 pages.

*Liquid Crystal Polymer (LCP) Air Cavity Packages*, Quantum Leap Packaging, Inc., Brochure, 2004, 2 pages.

Ko et al., "Thermal Package Enhancement Improves Hard Disk Drve Data Transfer Performance," Surface Mount Technology Association, http ://www. smta.org/knowledge/proceedings_abstract.cfm?PROC_ID=919 Feb. 5, 2002, 2 pages.

*Phone-Or/Technology*, Phone-Or, http ://web.archive.org/web/20020821191420/http://www.phone-or.com/technology.asp?pageID10 Aug. 21, 2002, 1 page.

Prismark Partners LLC, *The Prismark Wireless Technology Report*, Prismark Partners LLC, Mar. 2005, 27 pages.

Weigold et al., *A MEMS Condenser Microphone for Consumer Applications*, Analog Devices, Inc. and Pixtronix, Inc., Jan. 22, 2006, 4 pages.

Authorized Officer Massimo Navarri, *International Search Report and the Written Opinion of the International Searching Authority*, PCT/US2006/032909, Nov. 13, 2006, 12 pages.

Authorized Officer Ellen Moyse, *International Preliminary Report on Patentability*, International application No. PCT/US2006/032909, issued Feb. 26, 2008, 8 pages.

\* cited by examiner

MICROPHONE WITH IRREGULAR DIAPHRAGM

PRIORITY

This application is a divisional of U.S. application Ser. No. 11/476,378, filed Jun. 28, 2006, which claims the benefit of U.S. Provisional Application No. 60/710,517, filed Aug. 23, 2005, the disclosures of which are incorporated herein by reference in their entireties.

FIELD OF THE INVENTION

The invention generally relates to microphones and, more particularly, the invention relates to improving the performance of microphones.

BACKGROUND OF THE INVENTION

Condenser MEMS microphones typically have a diaphragm that forms a capacitor with an underlying backplate. Among other things, the sensitivity of the microphone is a function of this capacitance. To increase sensitivity, microphone designers typically attempt to form the diaphragm as close to the backplate as possible when in a static state. When too close, however, the diaphragm and plate may contact during use and thus, possibly stick together. Even if they do not stick together, contact between the diaphragm and backplate can degrade signal quality.

SUMMARY OF THE INVENTION

In accordance with one aspect of the invention, a microphone has a diaphragm that is configured to improve the signal to noise ratio. To that end, the microphone has a backplate having a hole therethrough, and a diaphragm movably coupled with the backplate. The diaphragm has a bottom surface (facing the backplate) with a protruding portion aligned with the hole in the backplate.

In illustrative embodiments, the diaphragm has a top surface that opposes the bottom surface. The protruding portion of the diaphragm forms a depression in the top surface. The protruding portion may have a depth that is greater than or equal to the thickness of the diaphragm. In other embodiments, the portion of the top surface of the diaphragm that is aligned with the hole is substantially planar.

The bottom surface of the diaphragm illustratively is not planar. Moreover, the backplate may have a plurality of holes therethrough, while the diaphragm has a plurality of protruding portions that each share a vertical plane with one of the plurality of holes. In some embodiments, the diaphragm has a plurality of dimples.

In accordance with another aspect of the invention, a microphone has a backplate having at least one hole formed therethrough, and a diaphragm secured to the backplate. The diaphragm has a protrusion extending toward the backplate. The protrusion substantially shares a vertical plane with the at least one hole.

The protrusion may have a minimum point that is closest to the backplate. The minimum point and the at least one hole can share the vertical plane.

In accordance with another aspect of the invention, a method of forming a microphone provides a backplate having a hole, and forms a diaphragm having a protruding portion on a bottom surface. The diaphragm is formed to be coupled with the backplate. The method also forms a space between the diaphragm and the backplate. Accordingly, the diaphragm bottom surface faces the backplate, while the protruding portion is aligned with the hole in the backplate.

In some embodiments, the diaphragm is coupled by forming an insulator layer between the backplate and the diaphragm. For example, the diaphragm may be formed by using surface micromachining techniques. As another example, the diaphragm may be formed by 1) depositing a filler material within the hole of the backplate, 2) adding a spacer layer to a surface of filler material, 3) adding diaphragm material to a surface of the spacer layer, and 4) removing the filler material.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, a MEMS microphone has a diaphragm that is contoured to improve its signal to noise ratio. To that end, the diaphragm has one or more protrusions that each are substantially aligned with at least one of the holes through its backplate. By doing this, portions of the diaphragm are closer to the backplate, thus increasing capacitance. Moreover, placing the protrusions in this manner relative to the holes should mitigate stiction problems if there is contact with the backplate. Details of illustrative embodiments are discussed below.

Figure 1:
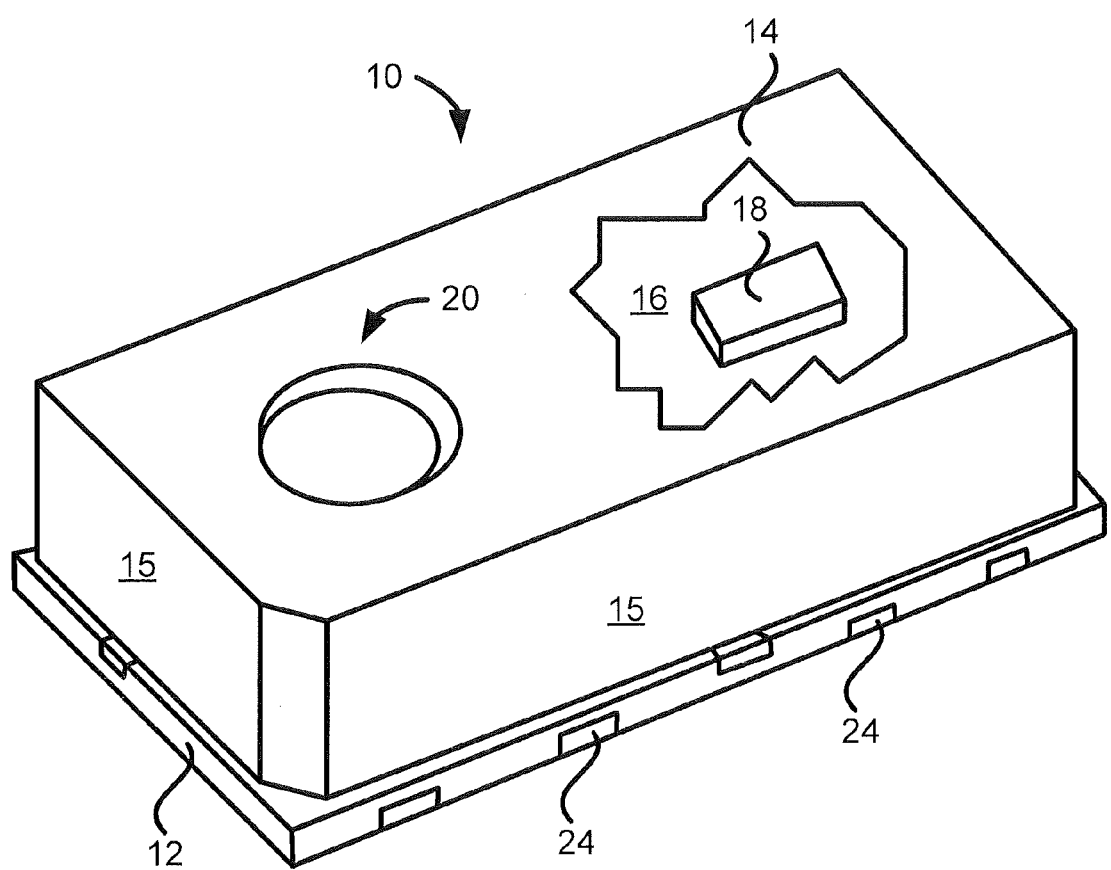
FIG. 1 schematically shows a packaged microphone that may be configured in accordance with illustrative embodiments of the invention.

FIG. 1 schematically shows a top, perspective view of a packaged microphone 10 that may be configured in accordance with illustrative embodiments of the invention. Among other things, the microphone 10 has a package base 12 that, together with a corresponding lid 14, forms an interior chamber 16 containing a microphone chip 18 (discussed below, also see FIG. 2) and, if desired, microphone circuitry (not shown). The lid 14 in this embodiment is a cavity-type lid having four walls 15 extending generally orthogonally from a top, interior face to form a cavity. The lid 14 secures to the top face of the substantially flat package base 12 to form the interior chamber 16.

The lid 14 also has an audio input port 20 that enables ingress of audio signals into the chamber 16. In alternative embodiments, however, the audio port 20 is at another location, such as through the package base 12, or through one of the side walls 15 of the lid 14. Audio signals entering the interior chamber 16 interact with the microphone chip 18 to produce an electrical signal that, with additional (exterior) components (e.g., a speaker and accompanying circuitry), produce an output audible signal corresponding to the input audible signal.

The package bottom face (not shown) has a number of contacts 24 for electrically (and physically, in many anticipated uses) connecting the packaged microphone 10 with a substrate, such as a printed circuit board or other electrical interconnect apparatus. The packaged microphone 10 may be used in any of a wide variety of applications. For example, the packaged microphone 10 may be used with mobile telephones, land-line telephones, computer devices, hearing aids, video games, biometric security systems, two-way radios, public announcement systems, and other devices that transduce signals. In fact, it is anticipated that the packaged microphone 10 could be used as a speaker to produce audible signals from electronic signals.

In illustrative embodiments, the package base 12 is a pre-molded, leadframe-type package (also referred to as a "pre-molded package"). It should be noted that discussion of a specific type of package, such as a flat leadframe package, is illustrative and not meant to be limiting. Various embodiments thus can use other types of packages, such as ceramic cavity packages. Accordingly, discussion of a leadframe package is not intended to limit various embodiments of the invention.

Figure 2:
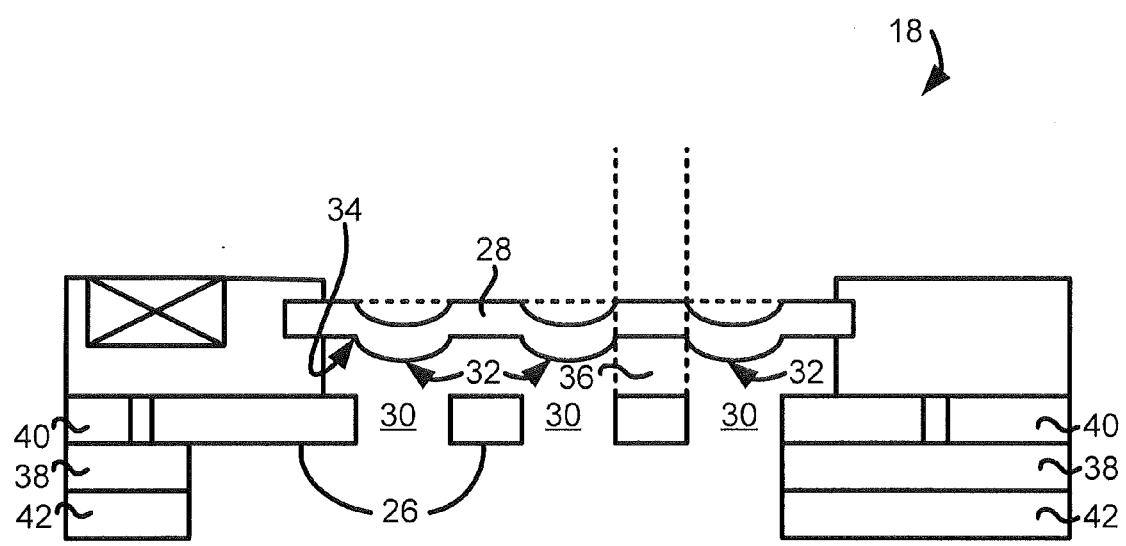
FIG. 2 schematically shows a cross-sectional view of a microphone chip that may be used by the microphone shown in FIG. 1.

FIG. 2 schematically shows a cross-sectional view of the MEMS microphone chip 18 (also referred to as a "microphone 18") shown in FIG. 1. Among other things, the microphone chip 18 has a static backplate 26 that supports and forms a variable capacitor with a diaphragm 28. In illustrative embodiments, the backplate 26 is formed from single crystal silicon (e.g., a part of a silicon-on-insulator wafer or a bulk silicon wafer), while the diaphragm 28 is formed from deposited polysilicon. In other embodiments, however, the backplate 26 and diaphragm 28 may be formed from other materials, such as polysilicon and single crystal silicon, respectively. To facilitate operation, the backplate 26 has a plurality of holes 30 (also referred to herein as "through-holes 30") that lead to a back-side cavity 29.

Audio signals cause the diaphragm 28 to vibrate, thus producing a changing capacitance. On-chip or off-chip circuitry converts this changing capacitance into electrical signals that can be further processed. This circuitry may be within the package discussed above, or external to the package.

In accordance with illustrative embodiments of the invention, the diaphragm 28 has a plurality of protrusions 32 extending from its otherwise substantially flat bottom surface 34. More specifically, the diaphragm 28 has a substantially flat bottom surface 34 with a plurality of protrusions 32 extending toward the backplate 26. The bottom surface 34 of the diaphragm 28 therefore at least has flat portions and protruding portions (i.e., the protrusions). As discussed above, the protrusions 32 should cause the diaphragm 28 to have a higher effective capacitance than prior art flat diaphragms. To mitigate potential stiction problems, each protrusion 32 preferably is aligned with one of the through-holes 30 in the backplate 26.

In some embodiments, the portion of the diaphragm bottom surface 34 without protrusions 32 has some contour to it. Such contour may be intentional, or a function of the tolerances of the fabrication process. Each protrusion 32 can have a farthest point (i.e., closest to the backplate 26) from the otherwise generally flat/contoured bottom surface portion a prescribed amount that is a function of the desired capacitance. In fact, protrusions 32 may extend a wide range of thicknesses relative to the "unprotruded" thickness of the diaphragm 28. For example, at least one of the protrusions 32 may extend between about 0.1 percent and multiple times the thickness of the unprotruded thickness. As a more specific example, the protrusions 32 may extend amount approximating between about twenty-five to seventy-five percent of the unprotruded thickness of the diaphragm 28. This unprotruded thickness is vertically taken through the portion of the diaphragm 28 that has substantially flat (or contoured) bottom and top surfaces. For example, if the diaphragm 28 is one micron thick at its flat portion, it may have a protrusion 32 extending 0.4 microns closer to the backplate 26 than another portion of its bottom surface. In this example, the protrusion 32 may be considered to extend forty percent of the unprotruded thickness of the diaphragm 28.

As another more specific example, the protrusions 32 may extend an amount approximating the unprotruded thickness of the diaphragm 28, or more than the unprotruded thickness of the diaphragm 28. The bottom surface 34 therefore may have a distinctly wavy appearance, an asymmetric appearance with distinct edges, or some other appearance.

The shape of each protrusion 32 can vary. For example, each protrusion 32 may be shaped as a convex member (e.g., FIG. 2), a cone, a frustoconical member, a cylindrical member, or in some irregularly shaped member (e.g., FIG. 7). Moreover, a single diaphragm 28 can have protrusions 32 with different shapes, and/or protrusions 32 not substantially aligned with one of the through-holes 30. Some embodiments have one protrusion 32 only.

In a corresponding manner, the top surface of the diaphragm 28 may be substantially planar (shown by the dashed horizontal lines in FIG. 2), or have a plurality of depressions 33 corresponding to the plurality of protrusions 32 (shown by the solid depression lines in FIG. 2). These depressions 33 can be any shape useful for the given application. In some embodiments, each depression 33 has a shape that is the complement of its corresponding protrusion 32. For example, if the protrusions 32 are convex members, then the top surface may have a plurality of corresponding concave areas and thus, have a dimpled appearance.

A protrusion 32 is considered to be "aligned" with a through-hole 30 when some part of it opposes some part of the through-hole 30. More specifically, as shown in FIG. 2, the wall of a through-hole 30 forms a geometric shape defined by its outermost boundary. For discussion purposes, if the hole 30 is perfectly round, assume this shape is a cylinder.

This cylinder may be logically extended vertically toward the bottom surface 34 of the diaphragm 28 to form an "imaginary cylinder portion," which is identified in FIG. 2 by reference number 36 (within the two vertically dashed lines). A protrusion 32 thus is considered to be aligned with a through-hole 30 when at least a portion of it is within this imaginary cylinder 36.

Stated another way, the imaginary cylinder 36 is considered to have a plurality of vertical planes (from the perspective of FIG. 2), including vertical planes aligned with its wall. In illustrative embodiments, the diaphragm 28 has at least one protrusion 32 that intersects at least one of these vertical planes, i.e., it shares a vertical plane with one of the through-holes 30.

Moreover, each protrusion 32 has a lowest point (from the perspective of FIG. 2, i.e., closest to the backplate 26) that preferably is substantially aligned with a central portion of its corresponding through-hole 30. As noted above, however, various embodiments do not require such precise alignment.

Figure 3:
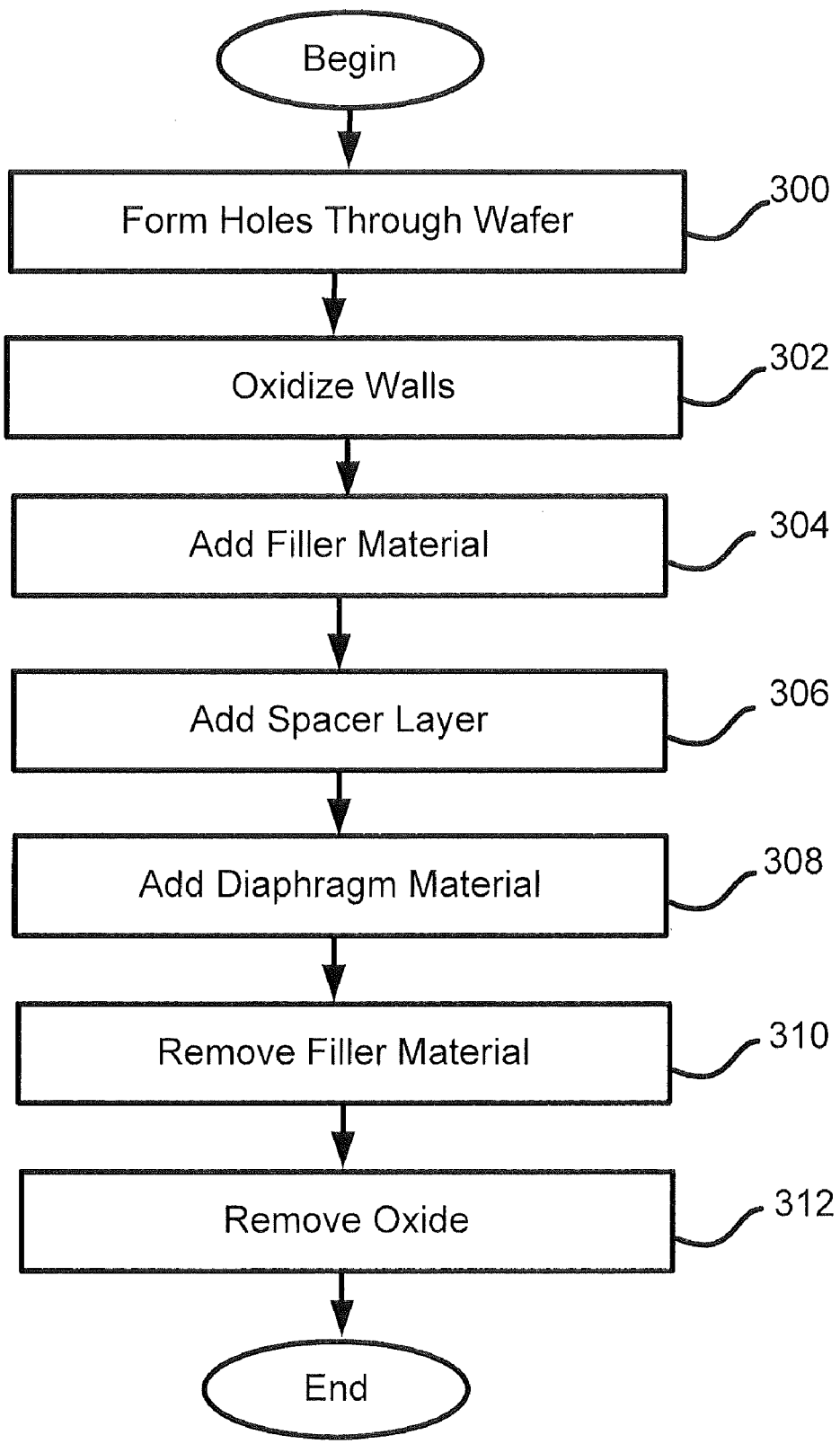
FIG. 3 shows a process of forming the microphone chip shown in FIG. 2.

FIG. 3 shows a process of forming the microphone chip 18 shown in FIGS. 1 and 2 in accordance with illustrative embodiments of the invention. This process uses conventional surface micromachining techniques that may be extended to simultaneously form a plurality of microphone chips 18 on a single wafer. For simplicity, however, this process is discussed as forming a single microphone chip 18 only. Those skilled in the art nevertheless should be capable of applying principles of this process to batch fabrication processes.

Figure 4:
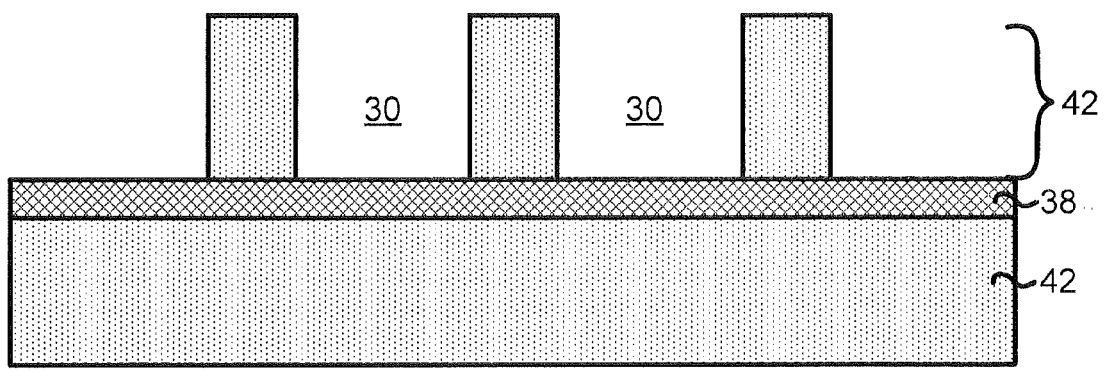
FIG. 4 schematically shows a cross-sectional view of a partially formed microphone chip at step 300 of the process shown in FIG. 3.

The process begins at step 300 by forming holes 30 through a single crystal silicon wafer (see FIG. 4). As noted above, illustrative embodiments use a silicon-on-insulator wafer (SOI wafer) as the starting wafer. As known those skilled in the art, and silicon-on-insulator layer has an insulator layer 38 between top and bottom wafers/layers 40 and 42. Although not drawn to scale in the figures, the top layer 40 typically as much thinner than the bottom layer 42. For example, the top layer 40 may be 10 microns thick while the bottom layer 42 may be 400 microns thick. Accordingly, the process forms the holes 30 through the top layer 40, using the insulator layer 38 as an etch stop.

Figure 5:
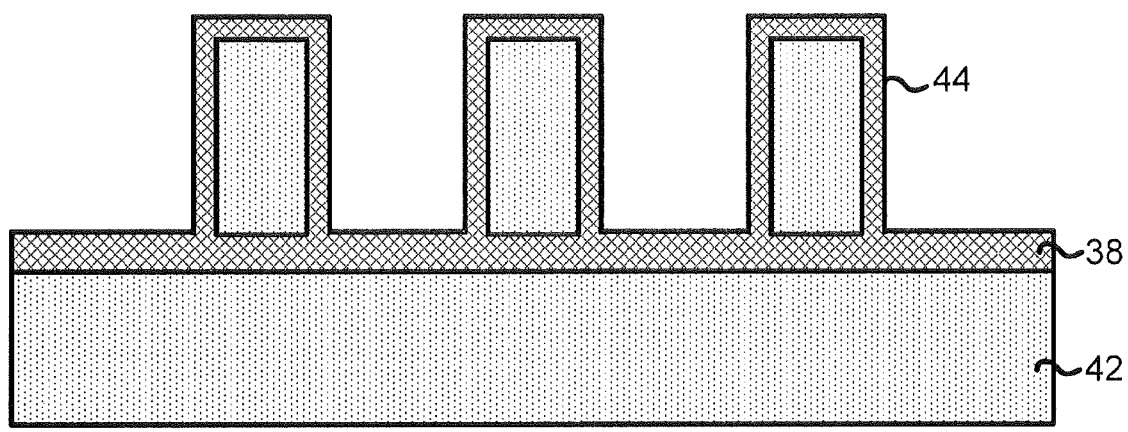
FIG. 5 schematically shows a cross-sectional view of a partially formed microphone chip at step 302 of the process shown in FIG. 3.

After forming the holes 30, the process continues to step 302 by oxidizing the exposed surfaces of the top layer 40 (FIG. 5). This new oxidized layer 44 essentially integrates with the insulator layer 38 of the SOI wafer.

Figure 6:
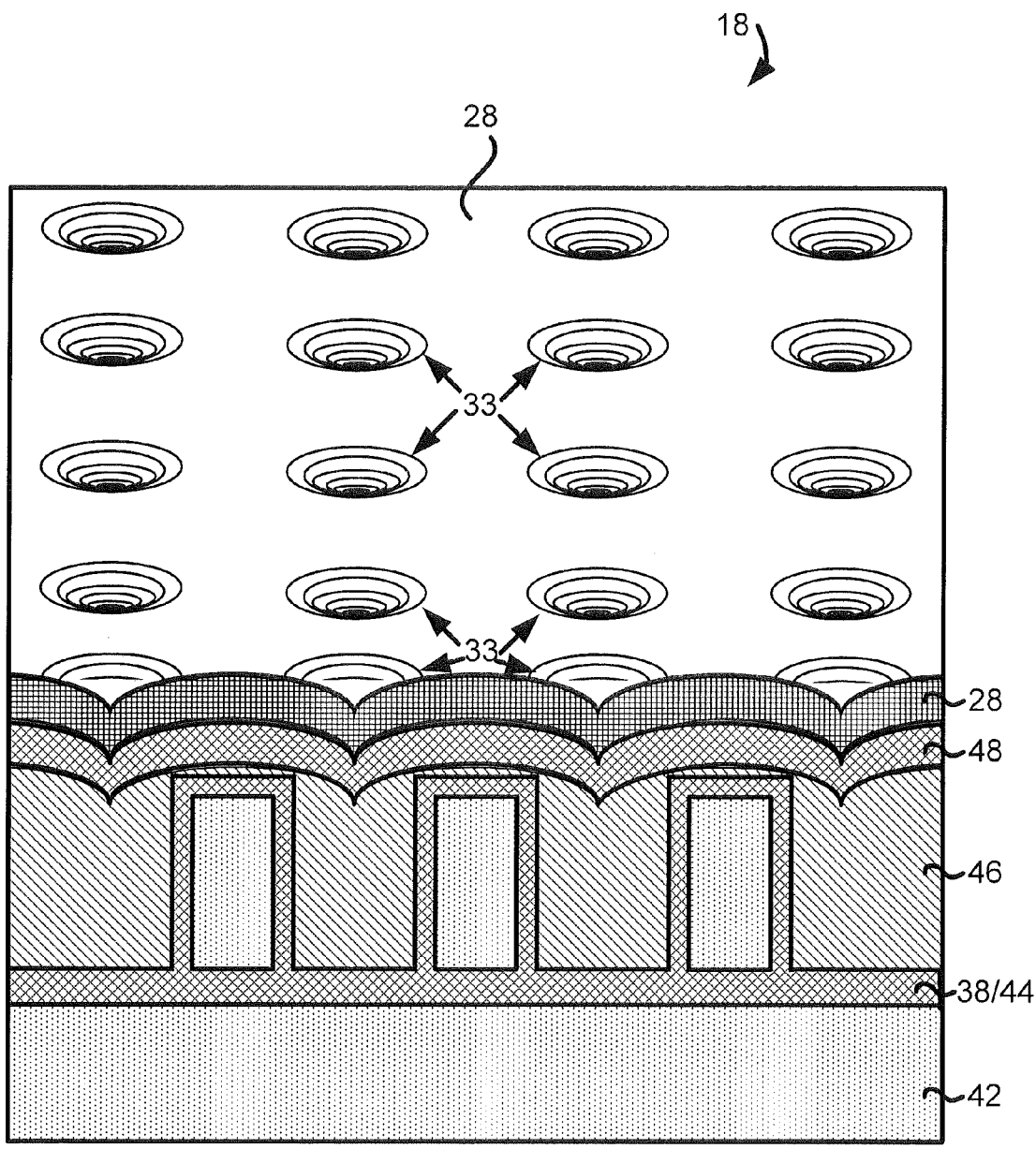
FIG. 6 schematically shows a cross-sectional view of a partially formed microphone chip at step 308 of the process shown in FIG. 3.

Fill material 46 (i.e., sacrificial material) then is added to the holes 30 and onto the remaining backplate surface (step 304, see FIG. 6, which includes additional layers above this fill layer). Among other things, the fill material 46 may be polysilicon. In accordance with illustrative embodiments of the invention, the fill material 46 is added unevenly to produce an uneven, wavy top surface (see FIG. 6, which shows a plurality of depressions 33 in the top surface of the diaphragm 28, formed by a later step below). Such top surface has a plurality of depressions 33 that generally define the location of each hole 30. For example, the holes 30 could be about 6.5 microns wide, but filled with 4.0 microns of polysilicon fill 18. More fill material 46 may be added to reduce the depth of the depressions 33, while less fill material 46 may be added to increase the depth of the depressions 33. Deep depressions 33 may form protrusions 32 that are closer to the backplate 26.

Alternatively, such holes 30 could be filled with an even amount of polysilicon fill 18, while the top of the backplate 26 also receives some of that polysilicon fill 18. Of course, those skilled in the art can use other techniques to produce the desired depressions 33, and resultant protrusions 32.

The process then continues to step 306, which adds a spacer layer 48 to the top surface of the fill material. This spacer layer 48 should be capable of withstanding exposure to materials that remove the fill material 46. For example, as discussed herein, xenon difluoride may be used to remove polysilicon fill material 46. In this case, the spacer layer 48 may be an appropriate oxide.

The diaphragm material then may be added at step 308 to produce the overall structure shown in cross-section and in perspective in FIG. 6. Specifically, this step adds polysilicon to the top surface of the spacer layer 48 to produce the diaphragm 28. Of course, at this stage of the process, the diaphragm 28 is immovable (i.e., unreleased). This diaphragm layer should take on the shape and contour of the fill and spacer layers 46 and 48, thus also having the wavy, dimpled appearance as shown in FIG. 6.

Accordingly, step 310 removes substantially all of the fill material 46 to release the diaphragm 28. To that end, as noted above, the process may apply a dry phase gas etch (using xenon difluoride) to the filler layer. The xenon difluoride should not significantly degrade the oxide, thus protecting the diaphragm 28 and the backplate 26. As known by those in the art, this dry phase gas phase etch process can be performed at room temperature. Accordingly, removing the fill material 46 in this manner should have a minimal impact on components sensitive to high temperatures.

Figure 7:
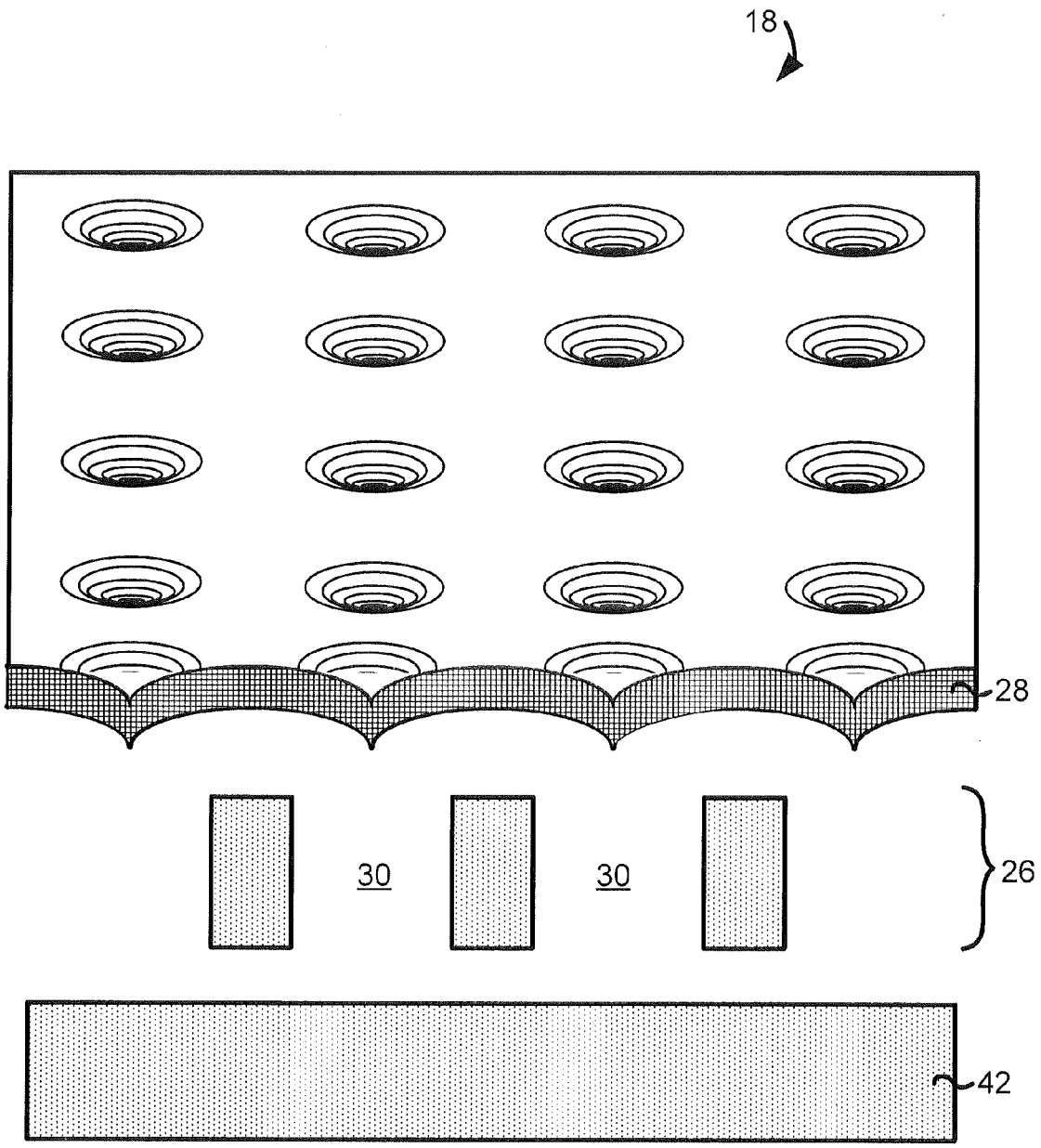
FIG. 7 schematically shows a cross-sectional view of a partially formed microphone chip at step 312 of the process shown in FIG. 3.

After removing the fill material 46, the process removes the oxide as shown in FIG. 7. To that end, after removing the sacrificial layer, the structure may be exposed to hydrofluoric acid, which removes the oxide. Accordingly, at this point in the process, the diaphragm 28 has a plurality of protrusions 32 that face the backplate 26. Note that the shape of the protrusions 32 shown in FIG. 7 is different than that of the protrusions 32 in FIG. 2. The bottom surface of the bottom layer 42 of the SOI wafer then may be thinned to expose the holes 30. Backgrinding or chemical thinning processes, among others, may be used. In some embodiments, for example, this occurs before removal of the fill material.

It should be noted that various aspects of this process may be modified. For example, rather than using polysilicon as the fill material 46, the process may use an oxide as the fill material 46. Those skilled in the art should understand that processes for removing such an oxide fill material often require significantly more time than those used for removing a polysilicon fill material 46. Moreover, certain materials may be used simply to comply with existing fabrication processes used for similar products.

The microphone chip 18 therefore has one or more protrusions 32 extending from the bottom surface 34 of its diaphragm 28 toward the backplate 26. This configuration effectively decreases the overall distance between two plates of the capacitor used to sense motion, i.e., the diaphragm 28 and the backplate 26. As known by those skilled in the art, decreasing the distance between two plates of a capacitor has the effect of increasing its overall capacitance.

The protrusions 32 provide at least one additional benefit. Specifically, they act as stops to mitigate stiction problems (problems arising when the diaphragm 28 contacts and then sticks to the backplate 26). Aligning protrusions 32 with the holes 30 further mitigates stiction problems because contact should occur, if at all, over a smaller surface area than if the protrusions 32 were not so aligned.

It also should be noted that the microphone chip 18 may be used for other purposes. For example, the microphone chip 18 may be used as a switch or as an inertial sensor (e.g., an accelerometer). Accordingly, discussion of various embodiments of the microphone chip 18 can apply to other functions and devices.

Although the above discussion discloses various exemplary embodiments of the invention, it should be apparent that those skilled in the art can make various modifications that will achieve some of the advantages of the invention without departing from the true scope of the invention.

What is claimed is:

1. A method of forming a MEMS device, the method comprising:
    providing a backplate having a hole;
    depositing a filler material within the hole to form an uneven top surface;
    forming a diaphragm on the uneven top surface so that the diaphragm has a protruding portion on a bottom surface, the diaphragm being formed to be coupled with the backplate; and
    forming a space between the diaphragm and the backplate, the diaphragm bottom surface facing the backplate, the protruding portion being substantially aligned with the hole in the backplate.

2. The method as defined by claim 1 wherein the diaphragm has a top surface that opposes the bottom surface, the protruding portion of the diaphragm forming a depression in the top surface.

3. The method as defined by claim 1 wherein the backplate has a plurality of holes therethrough, the diaphragm having a plurality of protruding portions that each share a vertical plane with one of the plurality of holes.

4. The method as defined by claim 1 wherein coupling comprises forming an insulator layer between the backplate and the diaphragm.

5. The method as defined by claim 1 wherein forming comprises using micromachining techniques.

6. The method as defined by claim 1 wherein forming comprises:
   adding a spacer layer to the uneven top surface of filler material;
   adding diaphragm material to a surface of the spacer layer; and
   removing at least a portion of the filler material.

7. The method as defined by claim 1 wherein the backplate is formed from an SOI wafer.

\* \* \* \* \*